United States Patent
Plainchault et al.

(10) Patent No.: US 9,225,408 B2
(45) Date of Patent: Dec. 29, 2015

(54) METHOD FOR INCREASING QUALITY OF SIGNALS RECEIVED BY AT LEAST ONE DESTINATION DEVICE AMONG A PLURALITY

(75) Inventors: Melanie Plainchault, Rennes (FR); Nicolas Gresset, Rennes (FR)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 284 days.

(21) Appl. No.: 13/983,943

(22) PCT Filed: Jan. 30, 2012

(86) PCT No.: PCT/EP2012/051412
§ 371 (c)(1),
(2), (4) Date: Nov. 22, 2013

(87) PCT Pub. No.: WO2012/107306
PCT Pub. Date: Aug. 16, 2012

(65) Prior Publication Data
US 2014/0071851 A1 Mar. 13, 2014

(30) Foreign Application Priority Data
Feb. 10, 2011 (EP) .................................. 11154041

(51) Int. Cl.
*H04L 27/28* (2006.01)
*H04B 7/04* (2006.01)
*H04B 7/02* (2006.01)
*H04B 7/06* (2006.01)

(52) U.S. Cl.
CPC .............. *H04B 7/0465* (2013.01); *H04B 7/024* (2013.01); *H04B 7/026* (2013.01); *H04B 7/0452* (2013.01); *H04B 7/0617* (2013.01)

(58) Field of Classification Search
USPC .......... 375/211, 260, 285, 295–296; 370/315, 370/318, 326
See application file for complete search history.

(56) References Cited

U.S. PATENT DOCUMENTS

| 8,913,526 B2 * | 12/2014 | Jung ............................ 370/276 |
| 2009/0227202 A1 * | 9/2009 | Doppler et al. ............ 455/11.1 |

(Continued)

OTHER PUBLICATIONS

"Configurations of Transparent Relay using Rel-9 Dual-Layer Beamforming", 3 GPP TSG RAN WG1 Meeting #58, R1-093285 $3^{rd}$ Generation Partnership Project (3GPP), Research in Motion, Agenda Item: 15.3, Discussion and Decision, pp. 1-7, XP 050351611, (Aug. 24-28, 2009).

(Continued)

*Primary Examiner* — Khanh C Tran
(74) *Attorney, Agent, or Firm* — Oblon, McClelland, Maier & Neustadt, L.L.P.

(57) ABSTRACT

A method determining a configuration of a wireless telecommunications network, each source device transmitting at least one flow of complex modulation symbols on a same resource to an associated destination device, including: obtaining a first channel matrices set representing transmission channels between the source devices and each destination device and a second channel matrices set representing transmission channels between a relay device and each destination device; selecting at least one flow of complex modulation symbols for which the relay device applies a pre-coding; determining a pre-coding matrix used by the relay device for applying the pre-coding to transmit pre-coded complex modulation symbols, on same resource as the complex modulation symbols transmitted by the source devices, the pre-coding matrix determined based on the first and second channel matrices sets, the selected at least one flow of complex modulation symbols, and a transmission power constraint applicable to the relay device.

15 Claims, 3 Drawing Sheets

(56) References Cited

U.S. PATENT DOCUMENTS

| | | | |
|---|---|---|---|
| 2009/0296626 A1* | 12/2009 | Hottinen et al. | 370/315 |
| 2012/0020279 A1* | 1/2012 | Kim et al. | 370/315 |
| 2012/0076243 A1* | 3/2012 | Gresset et al. | 375/320 |
| 2014/0112340 A1* | 4/2014 | Shin et al. | 370/389 |

OTHER PUBLICATIONS

Munoz, O. et al., "Non-Regenerative MIMO Relaying with Channel State Information", 2005 IEEE International Conference on Acoustics, Speech, and Signal Processing, vol. 3, pp. 361-364, XP 010792249, (Mar. 18, 2005).

Heliot, F. et al., " Power allocation for the downlink of nonregenerative cooperative multi-user MIMO Communication systesm", Personal Indoor and Mobile Radio Communications (PIMRC), 2010 IEEE 21$^{st}$ International Symposium on, IEEE, pp. 905-910, XP031838343, (Sep. 26, 2010).

International Search Report Issued Mar. 23, 2012 in PCT/EP12/051412 Filed Jan. 30, 2012.

* cited by examiner

METHOD FOR INCREASING QUALITY OF SIGNALS RECEIVED BY AT LEAST ONE DESTINATION DEVICE AMONG A PLURALITY

BACKGROUND OF THE INVENTION (1) Field of the Invention

The present invention generally relates to a method and a device for increasing the quality of signals respectively received by plural destination devices of a wireless telecommunications network, the signals being subject to interference being generated by plural flows of complex modulation symbols transmitted on the same resource.

(2) Description of Related Art Including Information Disclosed Under 37 CFR 1.97 and 1.98

When several source devices transmit signals to respective destination devices using the same resource, in the framework of a wireless telecommunications network, interference occurs. Interference degrades the quality of signals received by the destination devices and therefore may decrease the overall performance of the wireless telecommunications network.

It is desirable to overcome the aforementioned problems, which occur in typical wireless telecommunications networks.

BRIEF SUMMARY OF THE INVENTION

In particular, it is desirable to provide a solution that allows the increasing of the quality of signals received by at least one destination device among a plurality of destination devices of a wireless telecommunications system, when plural flows of complex modulation symbols are respectively transmitted to the destination devices using the same resource.

It is furthermore desirable to provide a solution that allows the increasing of the SINR (Signal-to-Interference-plus-Noise Ratio) of at least one signal among signals respectively received by destination devices of a wireless telecommunications system, when plural flows of complex modulation symbols are respectively transmitted to the destination devices using the same resource.

It is furthermore desirable to provide, when plural flows of complex modulation symbols are respectively transmitted to destination devices using the same resource, a solution that allows reducing the interference generated by one flow with any other flow of the plurality.

In addition, in the aforementioned context of wireless telecommunications network with plural destination devices, it is furthermore desirable to provide a solution that increases signal quality when one or more flows are intended to each destination device.

To that end, the present invention concerns a method for determining a configuration of a wireless telecommunications network, the configuration aiming at increasing a quality of signals received by at least one destination device among plural destination devices of the wireless telecommunications network, plural flows of complex modulation symbols being transmitted on a same resource by respective source devices of the wireless telecommunications network, the source devices being associated with respective destination devices, each source device transmitting at least one flow of complex modulation symbols on said same resource to its associated destination device. The method is such that it comprises the following steps:

an obtaining step of obtaining a first set of channel matrices representing transmission channels between the source devices and each destination device and a second set of channel matrices representing transmission channels between a relay device of the wireless telecommunications network and each destination device;

a selecting step of selecting at least one flow of complex modulation symbols for which the relay device has to apply a pre-coding;

a determining step of determining a pre-coding matrix aiming at being used by the relay device for applying the pre-coding to be able to transmit pre-coded complex modulation symbols, on the same resource as the complex modulation symbols transmitted by the source devices, in order to increase the quality of signals received by at least one destination device, the pre-coding matrix being determined on the basis of the first and second sets of channel matrices, of the selected at least one flow of complex modulation symbols and of a transmission power constraint applicable to the relay device.

Thus, when configuring the wireless telecommunications network with the determined configuration, the quality of signals received by at least one destination device is increased. In addition, the configuration takes practically into account hardware power transmission constraints of the relay device that is introduced in the wireless telecommunications network in order to increase the quality of signals received by the at least one destination device.

According to a particular feature, the selecting step comprises a step of obtaining, from each destination device, an information indicating at least one flow of complex modulation symbols aimed at being received by said destination device and for which said destination device is able to decode complex modulation symbols.

Thus, the distribution of the transmission power of the relay device is focused on the signals that are not yet decoded by the destination devices.

According to a particular feature, the selecting step comprises a step of identifying at least one flow of complex modulation symbols for which the relay device is able to decode complex modulation symbols.

Thus, the relay device may be incorporated in the wireless telecommunications system in order to increase the quality of signals received by at least one destination device without requiring adaptation of the source devices. Off-the-shelf source devices can therefore be used.

According to a particular feature, the transmission power constraint is related to a global transmission power budget for a whole set of transmit antennas of the relay device or to individual transmission power budget for each transmit antenna of the relay device.

Thus, when a global budget is considered, the transmission power budget of the relay device is optimally used for cases where the maximal transmission power per device allowed by the specifications of the wireless telecommunications network is more limiting than the transmission power capability of the transmit antennas of the relay device. When individual budgets are considered, the transmission power budget of the relay device is optimally used for cases where the transmission power capability of each antenna of the relay device is more limiting than the maximal transmission power per device allowed by the specifications of the wireless telecommunications network.

According to a particular feature, the determining step consists in determining the pre-coding matrix corresponding to an extreme of a function depending on interference observed on at least one flow of complex modulation symbols selected in the selecting step, the interference being observed by the destination device to which the flow of complex modulation symbols is transmitted and said function being subject to a constraint corresponding to the transmission power constraint.

Thus, the pre-coding matrix can be obtained via computation in analytical form or in numerical form, and is determined to optimize the system performance.

According to a particular feature, said function represents interference between signals received by said at least one destination device, which remains after application, by said at least one destination device, of a minimum mean square error filtering and the determined pre-coding matrix corresponds to a minima of said function.

Thus, when a minimum mean square error filtering is present in each destination device, the quality of signals and thus the performance of the destination devices is improved.

According to a particular feature, said function represents a maximum interference between signals received by any destination device to which at least one selected flow of complex modulation symbols is transmitted; or a sum of interferences between signals received by the destination devices to which at least one selected flow of complex modulation symbols is transmitted; or a generalized mean of interferences between signals received by all destination devices to which at least one selected flow of complex modulation symbols is transmitted.

Thus, when said function represents a maximum interference, the pre-coding focuses on the worst interference situation among the destination devices and improves the signal quality for the concerned destination device. By repeating the determining of the pre-coding matrix, the overall performance of the wireless telecommunications system is improved each time for the current worst interference situation. This feature is particularly advantageous when the remaining level of interference plus noise after minimum mean square error filtering is not homogeneous among the destination devices. And, when said function represents a sum of interferences, the improvement of signal quality is beneficial for all the concerned destination devices. This feature is particularly advantageous when the remaining level of interference plus noise after minimum mean square error filtering is substantially homogeneous among the destination devices. And, when said function represents a generalized mean of interferences, the improvement is equally distributed on all destination devices to which at least one selected flow of complex modulation symbols is transmitted. By choosing a high parameter for the generalized mean, this feature is particularly advantageous to provide a weighted improvement to all these destination devices, in order to provide more improvement to the destination devices observing more interference than others and to reach fairness, in terms of performance, between the destination devices.

According to a particular feature, said function represents a capacity of the transmission channel between at least one source device and its respective associated destination device and the determined pre-coding matrix corresponds to a maxima of said function.

Thus, even when no minimum mean square error filtering is present in the destination devices, the quality of signals and thus the performance of the destination devices is improved.

According to a particular feature, said function represents the minimum transmission channel capacity between any source device transmitting at least one selected flow of complex modulation symbols and its associated destination device; or a sum of transmission channel capacities between the source devices transmitting at least one selected flow of complex modulation symbols and their associated destination device; or a generalized mean of transmission channel capacities between the source devices transmitting at least one selected flow of complex modulation symbols and their associated destination devices.

Thus, when said function represents a minimum transmission channel capacity, the pre-coding focuses on the worst transmission channel situation among the destination devices and improves the signal quality for the concerned destination device. By repeating the determining of the pre-coding matrix, the overall performance of the wireless telecommunications system is improved each time for the current worst transmission channel situation. This feature is particularly advantageous when the transmission channel capacities are not homogeneous among the destination devices. And, when said function represents a sum of transmission channel capacities, the improvement of signal quality is beneficial for all the concerned destination devices. This feature is particularly advantageous when the transmission channel capacities are substantially homogeneous among the destination devices. And, when said function represents generalized mean of transmission channel capacities, the improvement is equally distributed on all destination devices to which at least one selected flow of complex modulation symbols is transmitted. By choosing a low negative parameter for the generalized mean, this feature is particularly advantageous to provide a weighted improvement to all these destination devices, in order to provide more improvement to the destination devices observing a lower capacity than others and to reach fairness, in terms of performance, between the destination devices.

According to a particular feature, the determining step consists in:
  determining the pre-coding matrix, corresponding to the extreme of the function, using a Lagrange multipliers method; or
  using a gradient descent method for iteratively determining the pre-coding matrix corresponding to the extreme of the function; or
  obtaining a plurality of pre-coding matrices and determining what pre-coding matrix from among the plurality of pre-coding matrices corresponds to the extreme of the function.

Thus, using a Lagrange multipliers method, the determining of the pre-coding matrix is accurate.

Thus, using a gradient descent method, a trade-off may be found between complexity and processing latency for the determining of the pre-coding matrix and the determining of the pre-coding matrix is kept simple and can be obtained in cases where computation in analytical form is not available.

Thus, by using a plurality of pre-coding matrices, the feedback of the pre-coding is reduced when said pre-coding matrices are not computed by the relay device.

The present invention also concerns a method for increasing a quality of signals received by at least one destination device among plural destination devices of the wireless telecommunications network, plural flows of complex modulation symbols being transmitted on a same resource by respective source devices of the wireless telecommunications network, the source devices being associated with respective destination devices, each source device transmitting at least one flow of complex modulation symbols on said same resource to its associated destination device. The method is such that a relay device of the wireless telecommunications network performs the following steps:
  an obtaining step of obtaining a first set of channel matrices representing transmission channels between the source devices and each destination device and a second set of channel matrices representing transmission channels between the relay device and each destination device;

a selecting step of selecting at least one flow of complex modulation symbols for which the relay device has to apply a pre-coding;

a determining step of determining a pre-coding matrix aiming at increasing the quality of signals received by at least one destination device, the pre-coding matrix being determined on the basis of the first and second sets of channel matrices, of the selected at least one flow of complex modulation symbols and of a transmission power constraint applicable to the relay device;

a pre-coding step of applying the pre-coding to the selected at least flow of complex modulation symbols, by using the determined pre-coding matrix in order to generate pre-coded complex modulation symbols;

a transmitting step of transmitting the pre-coded complex modulation symbols on the same resource as the complex modulation symbols transmitted by the source devices.

Thus, the quality of signals received by at least one destination device is increased. In addition, the configuration takes practically into account the hardware power transmission constraints of the relay device that is introduced in the wireless telecommunications network in order to increase the quality of signals received by the at least one destination device.

According to a particular feature, the selecting step comprises a step of obtaining, from each destination device, an information indicating at least one flow of complex modulation symbols aimed at being received by said destination device and for which said destination device is able, or not, to successfully decode complex modulation symbols, and the pre-coding step consists in applying the pre-coding to at least one complex modulation symbols generated by the relay device following a decoding of complex modulation symbols received from at least one respective source device, or in applying the pre-coding to an estimate of at least one complex modulation symbol received from at least one respective source device.

Thus, the pre-coding focuses on the flows of complex modulation symbols for which the concerned destination devices indicate deficiencies in decoding the complex modulation symbols. The improvement then focuses on flows of complex modulation symbols for which there is an effective need, as indicated by the destination devices. When applying the pre-coding to at least one complex modulation symbols generated by the relay device following a decoding of received complex modulation symbols, the increase of the signal quality at the concerned destination devices is yet improved. And, when applying the pre-coding to an estimate of at least one complex modulation symbol, a trade-off may be found between improvement of the signal quality at the concerned destination devices and the design complexity of the relay device, as well as the processing latency of the relay device.

According to a particular feature, the selecting step comprises a step of identifying at least one flow of complex modulation symbols for which the relay device is able to decode complex modulation symbols, and the pre-coding step consists in applying the pre-coding to said complex modulation symbols that the relay device is able to decode.

Thus, the relay device may be incorporated in the wireless telecommunications system in order to increase the quality of signals received by at least one destination device with limited adaptation of the destination devices.

The present invention also concerns a device for determining a configuration of a wireless telecommunications network, the configuration aiming at increasing a quality of signals received by at least one destination device among plural destination devices of the wireless telecommunications network, plural flows of complex modulation symbols being transmitted on a same resource by respective source devices of the wireless telecommunications network, the source devices being associated with respective destination devices, each source device transmitting at least one flow of complex modulation symbols on said same resource to its associated destination device. The device is such that it comprises the following means:

obtaining means for obtaining a first set of channel matrices representing transmission channels between the source devices and each destination device and a second set of channel matrices representing transmission channels between a relay device of the wireless telecommunications network and each destination device;

selecting means for selecting at least one flow of complex modulation symbols for which the relay device has to apply a pre-coding;

determining means for determining a pre-coding matrix aiming at being used by the relay device for applying the pre-coding to be able to transmit pre-coded complex modulation symbols, on the same resource as the complex modulation symbols transmitted by the source devices, in order to increase the quality of signals received by at least one destination device, the determining means being adapted so that the pre-coding matrix is determined on the basis of the first and second sets of channel matrices, of the selected at least one flow of complex modulation symbols and of a transmission power constraint applicable to the relay device.

The present invention also concerns a relay device for increasing a quality of signals received by at least one destination device among plural destination devices of the wireless telecommunications network, plural flows of complex modulation symbols being transmitted on a same resource by respective source devices of the wireless telecommunications network, the source devices being associated with respective destination devices, each source device transmitting at least one flow of complex modulation symbols on said same resource to its associated destination device. The relay device is such that it comprises the following means:

obtaining means for obtaining a first set of channel matrices representing transmission channels between the source devices and each destination device and a second set of channel matrices representing transmission channels between the relay device and each destination device;

selecting means for selecting at least one flow of complex modulation symbols for which the relay device has to apply a pre-coding;

determining means for determining a pre-coding matrix aiming at increasing the quality of signals received by at least one destination device, the pre-coding matrix being determined on the basis of the first and second sets of channel matrices, of the selected at least one flow of complex modulation symbols and of a transmission power constraint applicable to the relay device;

pre-coding means for applying the pre-coding to the selected at least flow of complex modulation symbols, by using the determined pre-coding matrix in order to generate pre-coded complex modulation symbols;

transmitting means for transmitting the pre-coded complex modulation symbols on the same resource as the complex modulation symbols transmitted by the source devices.

The present invention also concerns, in at least one embodiment, a computer program that can be downloaded from a communication network and/or stored on a medium that can be read by a computer and run by a processor. This computer program comprises instructions for implementing the aforementioned methods in any one of their various embodiments, when said program is run by the processor.

The present invention also concerns an information storage means, storing a computer program comprising a set of instructions that can be run by a processor for implementing the aforementioned methods in any one of their various embodiments, when the stored information is read by a computer and run by a processor.

Since the features and advantages related to the configuration-determining device, to the relay device and to the computer program are identical to those already mentioned with regard to the corresponding aforementioned methods, they are not repeated here.

The characteristics of the invention will emerge more clearly from a reading of the following description of an example of embodiment, said description being produced with reference to the accompanying drawings, among which:

DETAILED DESCRIPTION OF THE INVENTION

Figure 1:
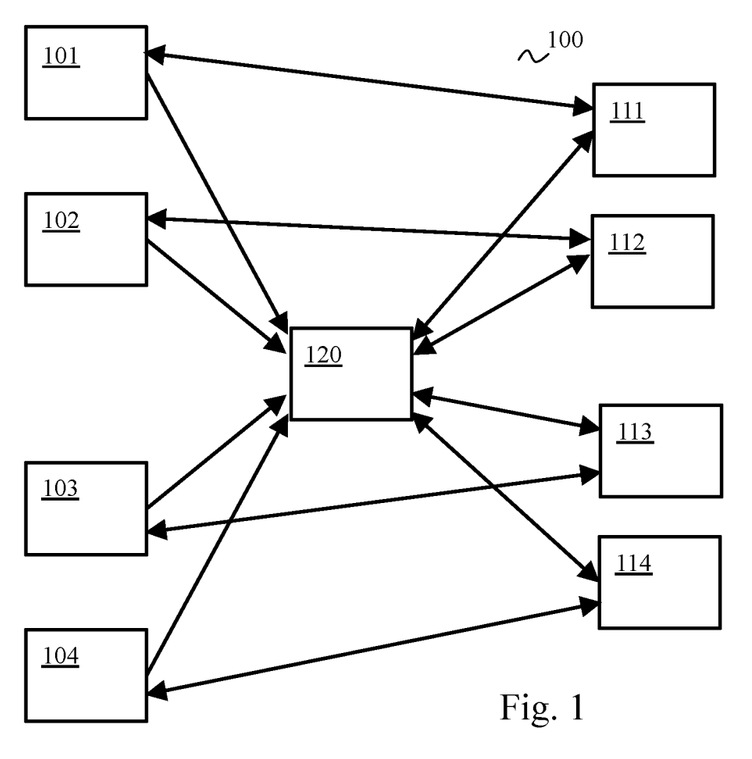
FIG. 1 schematically represents an architecture of a wireless telecommunications network in which the present invention may be implemented.

FIG. 1 schematically represents an architecture of a wireless telecommunications network in which the present invention may be implemented. The wireless telecommunications network 100 may be a local area network or a wireless cellular telecommunications network.

In the wireless telecommunications network 100, plural source devices 101, 102, 103, 104 respectively transmit information words in the form of signals to plural destination devices 111, 112, 113, 114 using a same frequency and time resource. In other words, the plurality of source devices 101, 102, 103 and 104 transmit signals that overlap in terms of transmission frequency or frequencies and that further overlap in terms of transmission time period or periods.

In the illustrative example of FIG. 1, the source device 101 transmits at least one flow of complex modulation symbols to the destination device 111, the source device 102 transmits at least one flow of complex modulation symbols to the destination device 112, the source device 103 transmits at least one flow of complex modulation symbols to the destination device 113 and the source device 104 transmits at least one flow of complex modulation symbols to the destination device 114. In that sense, the source devices 101, 102, 103, 104 and the destination devices 111, 112, 113, 114 are associated.

Let's denote S the number of source devices in the wireless telecommunications network 100. The wireless telecommunications network 100 therefore also comprises the same number S of destination devices.

Let's further denote N the number of flows of complex modulation symbols transmitted from the source devices 101, 102, 103, 104 to the destination devices 111, 112, 113, 114. It can be noticed that N≥S.

The source devices 101, 102, 103, 104 may be mobile terminals and the destination devices 111, 112, 113, 114 may be base stations, such as in the uplink context of a cellular telecommunications network.

The source devices 101, 102, 103, 104 may be base stations and the destination devices 111, 112, 113, 114 may be mobile terminals, such as in the downlink context of a cellular telecommunications network.

Each source device 101, 102, 103, 104 may perform beamforming in order to transmit plural flows of complex modulation symbols to its associated destination devices 111, 112, 113, 114.

Each source device 101, 102, 103, 104 transmits at least one information word in the form of at least one flow of complex modulation symbols to its associated destination device 111, 112, 113, 114. As the flows of complex modulation symbols are transmitted on the same resource of the wireless telecommunications network 100, the flow, or flows, of complex modulation symbols transmitted by one source device 101, 102, 103 or 104 may produce interference with other flow, or flows, of complex modulation symbols.

Each source device 101, 102, 103 and 104 may comprise an encoder that encodes information words, which are further interleaved to produce coded bits. Encoding and interleaving is generally performed by a rate matching algorithm, such as the one used in the 3GPP-LTE (Third Generation Partnership Project-Long Term Evolution) standard, that allows generating vectors of any size from the information words or, in other words, that provides a wide range of possible coding rates.

The coded bits are then processed by a discrete modulation component, which may for instance be a QPSK (Quadrature Phase Shift Keying) modulator or a 16-QAM (Quadrature Amplitude Modulation) modulator, in order to obtain complex modulation symbols. The flows of complex modulation symbols may be generated by using the same modulation scheme or different modulation schemes. Each flow of complex modulation symbols may be generated by successively using different modulation schemes.

The source devices 101, 102, 103, 104 may generate the complex modulation symbols without using the aforementioned encoder. The principle of the present invention would also operate in order to increase the quality of the signals received by at least one of the destination devices 111, 112, 113, 114, especially when an MMSE (Minimum Mean Square Error) filtering module is included in each destination device 111, 112, 113, 114.

The information words are provided with redundancy check data, such as a CRC (Cyclic Redundancy-Check) portion. In the wireless telecommunications network 100, an HARQ (Hybrid-ARQ or Hybrid Automatic Repeat reQuest) mechanism is preferably used to provide retransmission capability from the source devices 100, 101, 102, 103, 104 to their respective associated destination devices 111, 112, 113, 114. With such an HARQ mechanism, a transmission of redundancy data is performed when the concerned destination device 111, 112, 113 or 114 indicates to the concerned source device 100, 101, 102, 103 or 104 that it is not able to successfully retrieve at least one transmitted information word. Such a situation occurs when the concerned destination device 111, 112, 113 or 114 detects inconsistencies between the information word(s) and the concerned CRC data.

In order to increase the SINR and thus improve the quality of signals received by at least one destination device 111, 112, 113 or 114, the wireless telecommunications network 100 further comprises a relay device 120.

In at least one embodiment, the source devices 101, 102, 103, 104 are not aware of the presence of the relay device 120 in the wireless telecommunications network 100.

In any case, the source devices 101, 102, 103, 104 don't participate in the pre-coding detailed hereinafter. This pre-coding is therefore exclusively performed by the relay device 120.

The relay device 120 is adapted to obtain at least one complex modulation symbol, or estimate thereof, transmitted by at least one respective source device 101, 102, 103 or 104.

The complex modulation symbols may be obtained by retrieving information words transmitted by the concerned source devices, and applying appropriate coding scheme, rate matching and modulation processes. It means that the relay device 120 is adapted to apply coding scheme, rate matching and modulation processes similar to those of the concerned source device 101, 102, 103 or 104.

Estimates of information word may also be obtained by using a data link from the source devices 101, 102, 103, 104 to the relay device 120, which can be a wireless link or a fixed access link.

The relay device 120 is further adapted to apply a pre-coding to the obtained complex modulation symbols by using a pre-coding matrix P. The relay device 120 therefore generates pre-coded complex modulation symbols. The pre-coding matrix P is defined so as to improve the quality of the signals received by at least one destination device 111, 112, 113, 114.

The relay device 120 is further adapted to transmit the pre-coded complex modulation symbols to the concerned destination device(s) 111, 112, 113, 114. Each concerned destination device 111, 112, 113, 114 thus receives complex modulation symbols from its associated source device 101, 102, 103 or 104 and from the relay device 120. It has to be further noted that the relay device 120 transmits the pre-coded complex modulation symbols using the same resource as the concerned source device 101, 102, 103 or 104.

In one embodiment, in order to perform these transmissions of complex modulation symbols, the relay device 120 receives beforehand the concerned information words or the complex modulation symbols from the concerned source device 101, 102, 103 or 104. For instance, a dedicated communication link between the relay device 120 and the concerned source device 101, 102, 103 or 104 may be set up.

In another embodiment, the relay device 120 is able to use information words retrieved by applying a decoding to received complex modulation symbols. When the concerned source device 101, 102, 103 or 104 performs a retransmission of complex modulation symbols derived from these information words, the relay device 120 is therefore able to generate and transmit pre-coded complex modulation symbols from the retrieved information words.

An occurrence of such a retransmission may be determined by capturing and analysing the feedback provided by the concerned destination device 111, 112, 113 or 114, when an HARQ mechanism is used between the source devices 101, 102, 103, 104 and their respective associated destination devices 111, 112, 113, 114.

The computation and use of the aforementioned pre-coding matrix P are detailed hereinafter with regard to FIGS. 3, 4 and 5.

Each destination device 111, 112, 113, 114 preferably comprises an MMSE filtering module to retrieve the complex modulation symbols transmitted by its associated source device 101, 102, 103 or 104. However, after decoding as performed by the MMSE filtering module, interferences may remain.

Let's denote j an index used to identify each source device among the S source devices of the wireless telecommunications network 100. It can be noticed that the index j also identifies the destination device 111, 112, 113 or 114 associated with the considered source device 101, 102, 103 or 104.

Let's further denote $\Omega$ a set of indexes used to identify each flow of complex modulation symbols transmitted from any source device 101, 102, 103 or 104 to its associated destination device 111, 112, 113 or 114. The cardinality of $\Omega$ is therefore equal to N.

Let's also denote $\Omega_j$ the subset of at least one index such that, if an index b of $\Omega$ belongs to $\Omega_j$, then the complex modulation symbol $X_b$ is transmitted by the source device identified by the index j to its associated destination device. Therefore the subset $\Omega_j$ is used to identify the flow, or flows, of complex modulation symbols transmitted by the source device identified by the index j to its associated destination device.

Let's denote X a vector of complex modulation symbols transmitted by the source devices 101, 102, 103, 104 during a given period of time. Let's further denote $X_j$ the vector of complex modulation symbols transmitted by the source device identified by the index j and which are aimed at being received by the destination device identified by the index j.

Let's further denote $D_j$ a matrix, which size is N×N, having non-null entries only on the diagonal at the indexes belonging to $\Omega_j$, said non-null entries being equal to 1. It can be noticed that:

$$D_j = D_j^\dagger = D_j D_j^\dagger$$

It has to be noted that, for a given matrix M, $M^\dagger$ represents the transpose conjugate of M.

Upon reception of a vector complex of modulation symbols $Y_j$ corresponding to the vector of complex modulation symbols $X_j$, the destination device identified by the index j performs an estimation of the vector $D_j X$, and obtains an estimated vector $\tilde{X}_j$ of complex modulation symbols. The size of the estimated vector $\tilde{X}_j$ is N and the estimated vector $\tilde{X}_j$ comprises zeros at position indexes not in the subset $\Omega_j$.

Using the MMSE filtering module, the estimated vector $\tilde{X}_j$ is obtained as follows:

$$\tilde{X}_j = W_j(P) Y_j$$

wherein:

$$W_j(P) = D_j(H_j + F_j P \Delta_r)^\dagger ((H_j + F_j P \Delta_r) D_j (H_j + F_j P \Delta_r)^\dagger + \Sigma_j (P))^{-1}$$

$$Y_j = (H_j + F_j P \Delta_r) X + \eta_j$$

and:

$H_j$ is a matrix corresponding to the transmission channel observed between the source devices 101, 102, 103, 104 and the destination device identified by the index j. $H_j$ is therefore a channel matrix representing the transmission channel between the source devices 101, 102, 103, 104, and the destination device identified by the index j. The size of $H_j$ is $R_j \times N$, wherein $R_j$ is the number of receive antennas of the destination device identified by the index j;

$\eta_j$ is a vector, which size is $R_j \times 1$, representing the additive white Gaussian noise with variance $N_0$ per real dimension observed at each receive antenna of the destination device identified by the index j, which also encompasses the interference from the neighbouring transmission systems sharing the same resource, typically sharing the same transmission frequency or frequency range;

$F_j$ is a matrix corresponding to the transmission channel observed between the relay device 120 and the destination device identified by the index j. $F_j$ is therefore a channel matrix representing the transmission channel between the relay device 120 and the destination device identified by the index j. The size of $F_j$ is $R_j \times T_r$, wherein $T_r$ is the number of transmit antennas of the relay device 120;

$\Delta_r$ is a diagonal matrix, which size is $N \times N$, with ones at position indexes i on the diagonal corresponding to a selection of flows of complex modulation symbols $X_i$ for which the relay device 120 has to apply the pre-coding and with zeros elsewhere;

P is the pre-coding matrix, which size is $T_r \times N$; and $\Sigma_j(P)$ is the covariance matrix of the interference observed by the destination device identified by the index j.

The channel matrices $H_j$ and $F_j$ are preferably scaled by the transmission power of the source devices 101, 102, 103, 104 and of the relay device 120 respectively, and also take into account the channel wide band attenuation.

The pre-coding matrix may be understood as the association of the matrices $\Delta_r$ and P, and more particularly as the product $P\Delta_r$.

If the destination device identified by the index j knows the transmission channel from the source devices other than the one identified by the index j, the covariance matrix $\Sigma_j(P)$ is expressed as follows:

$$\Sigma_j(P) = (H_j + F_j P \Delta_r) \overline{D}_j (H_j + F_j P \Delta_r)^\dagger + 2\sigma_j^2 I_{R_j}$$

wherein:

I is an identity matrix and more precisely $I_{R_j}$ is an identity matrix of size $R_j$;

$\sigma_j^2$ represents the variance of the interference plus noise observed at the destination device identified by the index j, upstream from any MMSE filtering; and $\overline{D}_j$ is a diagonal matrix, which size is $N \times N$, such that $\overline{D}_j = I_N - D_j$.

This situation is also referred to as full CSI (Channel State Information) knowledge at the considered destination device 111, 112, 113 or 114. The considered destination device 111, 112, 113 or 114 may then transmit this information to the relay device 120.

If the channel from the source devices other than the one identified by the index j is known on a long-term basis by the destination device identified by the index j, the covariance matrix $\Sigma_j(P)$ is expressed as follows:

$$\Sigma_j(P) = E[(H_j + F_j P \Delta_r) \overline{D}_j (H_j + F_j P \Delta_r)^\dagger] + 2\sigma_j^2 I_{R_j}$$

wherein E[Z] represents the expectation of Z.

This situation is also referred to as partial CSI knowledge at the considered destination device 111, 112, 113 or 114. The considered destination device 111, 112, 113 or 114 transmits this information to the relay device 120.

It may be noted that, even though the considered destination device 111, 112, 113 or 114 has full CSI knowledge, it may transmit only partial CSI knowledge to the relay device 120.

Figure 3:
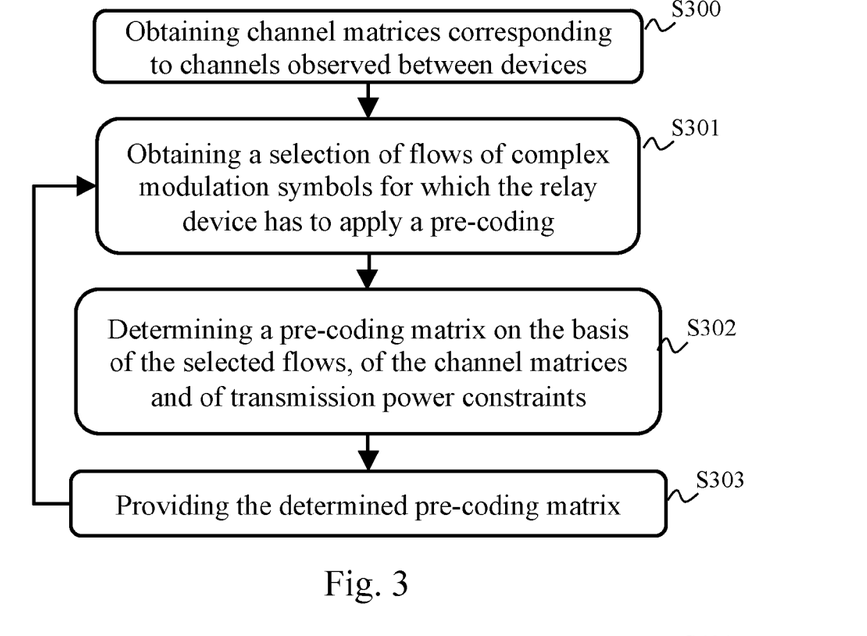
FIG. 3 schematically represents an algorithm for determining a pre-coding matrix to be used by the relay device in order to generate pre-coded complex modulation symbols.
Figure 4:
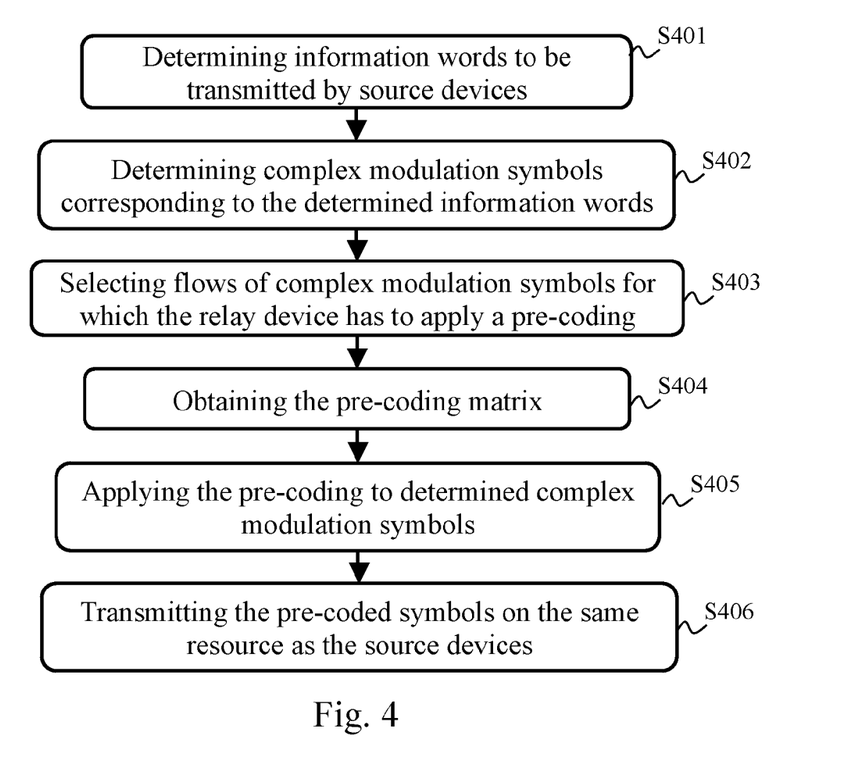
FIG. 4 schematically represents an algorithm performed by the relay device for transmitting pre-coded complex modulation symbols to at least one destination device of the telecommunications network of FIG. 1, according to a first embodiment.
Figure 5:
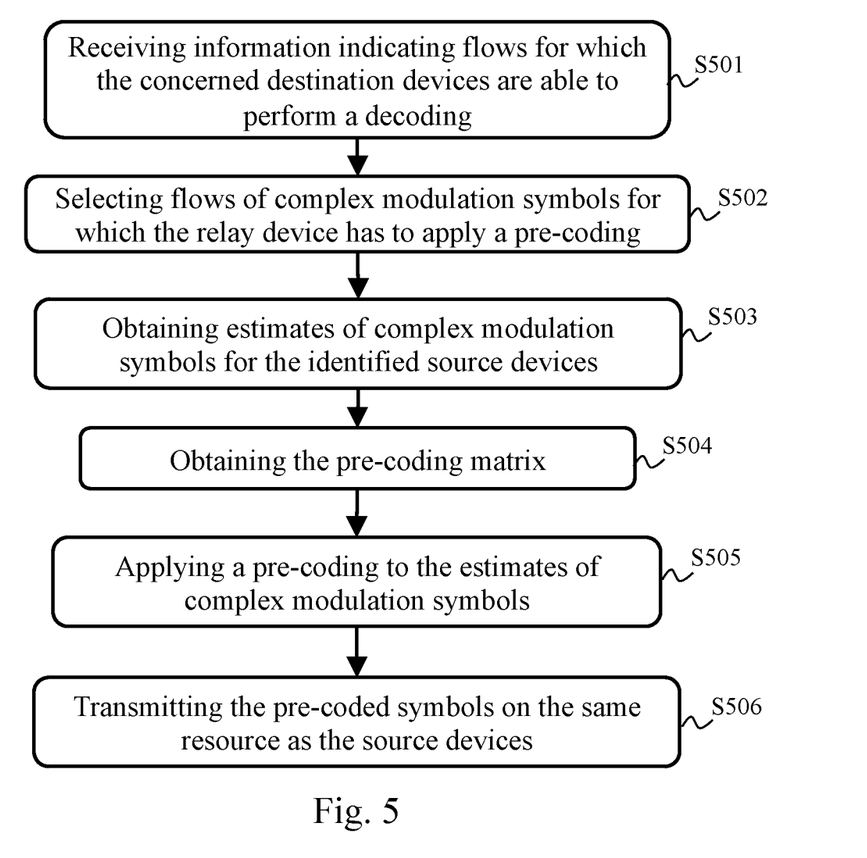
FIG. 5 schematically represents an algorithm performed by the relay device for transmitting pre-coded complex modulation symbols to at least one destination device of the telecommunications network of FIG. 1, according to a second embodiment.

It is proposed to determine and further adapt the pre-coding matrix P in order to improve the SINR associated with the signals received by at least one destination device 111, 112, 113, 114, as detailed hereafter with regard to FIGS. 3, 4 and 5.

Figure 2:
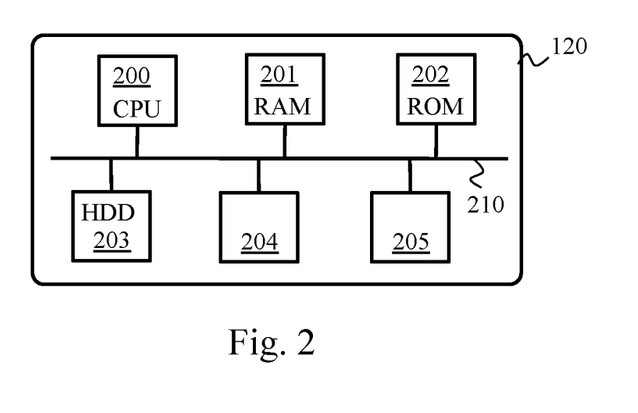
FIG. 2 schematically represents an architecture of a relay device of the telecommunications network of FIG. 1.

FIG. 2 schematically represents an architecture of the relay device 120. According to the shown architecture, the relay device 120 comprises the following components interconnected by a communications bus 210: a processor, microprocessor, microcontroller or CPU (Central Processing Unit) 200; a RAM (Random-Access Memory) 201; a ROM (Read-Only Memory) 202; a HDD (Hard-Disk Drive) 203, or any other device adapted to read information stored on storage means; a first wireless communication interface 204 and a second wireless communication interface 205.

CPU 200 is capable of executing instructions loaded into RAM 201 from ROM 202 or from an external memory, such as HDD 203. After the relay device 120 has been powered on, CPU 200 is capable of reading instructions from RAM 201 and executing these instructions. The instructions form one computer program that causes CPU 200 to perform some or all of the steps of the algorithms described hereafter with regard to FIGS. 3, 4 and 5.

Any and all steps of the algorithms described hereafter with regard to FIGS. 3, 4 and 5 may be implemented in software by the execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

The wireless communication interface 204 enables the relay device 120 to receive signals from the source devices 101, 102, 103, 104.

The wireless communication interface 205 enables the relay device 120 to transmit signals to the destination devices 111, 112, 113, 114. The wireless communication interface 205 may also enable the relay device 120 to receive signals from the destination devices 111, 112, 113, 114.

In another embodiment, the relay device 120 is not full-duplex, but is half-duplex. In this case, a single wireless communication interface is implemented and is alternatively used in reception and transmission mode.

It has to be noted that the destination devices 111, 112, 113, 114 may also be implemented on the basis of the architecture schematically shown in FIG. 2.

FIG. 3 schematically represents an algorithm for determining the pre-coding matrix P, according to at least one embodiment of the present invention. The algorithm of FIG. 3 aims at defining a configuration of the wireless telecommunications network 100, namely via setting the pre-coding matrix P, aiming at increasing the quality of signals received by at least one destination device 111, 112, 113, 114.

The algorithm of FIG. 3 is described hereafter as being performed by the relay device 120. This algorithm may however be performed by a device other than the relay device 120. This other device collects the necessary information from the relay device 120 and the destination devices 111, 112, 113, 114 and provides the pre-coding matrix P or a plurality of pre-coding matrices to the relay device 120, in a same manner as aforementioned. This other device may, or not, be actually part of the wireless telecommunications network 100. For instance, this other device may be connected to the relay device 120 by a wired link.

In a step S300, the relay device 120 obtains information about the channels observed between the source devices 101, 102, 103, 104 and the destination devices 111, 112, 113, 114, as well as between the relay device 120 and the destination devices 111, 112, 113, 114. Such information is provided by each destination device 111, 112, 113, 114. The destination devices 111, 112, 113, 114 may obtain this information by short-term measurements performed on the channels. In the state of the art, this information is often referred to as short-term channel state information, and is practically suitable for slow-varying channel conditions. The destination devices 111, 112, 113, 114 may also obtain this information by long-term measurements performed on the channels, such as on the basis of the covariance matrices of the MIMO channels. In the state of the art, this information is often referred to as long-term channel state information, and is practically suitable for fast-varying channel conditions, or in systems with limited feedback. An approach for determining the channel state information is based on a training sequence, or pilot sequence, where a known signal is transmitted and the channel matrix representing the transmission channel conditions is estimated using the combined knowledge of the transmitted and received signal. Each destination device identified by the index j may transmit to the relay device 120 the channel matrices $H_j$ and $F_j$, or long-term channel state information to allow the relay device 120 to build them or equivalent matrices.

In other words, the relay device 120 obtains the channel matrices $H_j$ and $F_j$, or equivalent matrices, at least for the transmission channels on which flows of complex modulation symbols that can be selected in a step S403 or in a step S502 detailed hereafter with regard to FIG. 4 or 5 respectively.

Thus, during the step S300, the relay device 120 obtains a first set of channel matrices $H_j$ representing transmission channels between the source devices and each destination device and a second set of channel matrices $F_j$ representing transmission channels between the relay device 120 and each destination device.

In a following step S301, the relay device obtains a selection of flows of complex modulation symbols for which the relay device 120 has to apply the pre-coding. This selection results from the execution of the step S403 or the step S502 detailed hereafter with regard to FIG. 4 or 5 respectively.

In a following step S302, the relay device 120 determines the pre-coding matrix P on the basis of the first and second sets of channel matrices, of the selection of at least one flow of complex modulation symbols and of a transmission power constraint applicable to the relay device 120.

This transmission power constraint allows determining coefficients of the pre-coding matrix P that meet the requirements of the transmission power specifications or characteristics of the relay device 120 and/or more generally of the wireless telecommunications network 100. Such requirements of the wireless telecommunications network 100 may be defined by governmental regulations.

In one embodiment, the transmission power constraint is related to a global transmission power budget for the whole set of the $T_r$ transmit antennas of the relay device 120. Thus, when such a global budget is considered, the transmission power budget of the relay device 120 is optimally used for cases where the maximal transmission power per device allowed by the specifications of the wireless telecommunications network 100 is more limiting than the transmission power capability of the transmit antennas of the relay device 120. In this case, the transmission power constraint h(P) may be expressed as follows, on the basis of a trace function:

$$h(P) = \text{Trace}(\Delta_r^\dagger P^\dagger P \Delta_r) - T_r$$

In another embodiment, the transmission power constraint is related to an individual transmission power budget for each transmit antenna of the relay device 120. Thus, when such individual budgets are considered, the transmission power budget of the relay device 120 is optimally used for cases where the transmission power capability of each antenna of the relay device 120 is more limiting than the maximal transmission power per device allowed by the specifications of the wireless telecommunications network 100. In this case, the transmission power constraint h(P) may be expressed as follows, on the basis of computing a determinant, assuming that N is larger than $T_r$:

$$h(P) = \det(PP^\dagger - I_{T_r})$$

wherein $I_{T_r}$ is an identity matrix of size $T_r$.

The aforementioned expressions of the transmission power constraint h(P) allows guaranteeing that the pre-coding matrix P respects the power maxima defined by the transmission power budget.

In the embodiments detailed hereafter, the transmission power constraint h(P) is related to a global transmission power budget for the whole set of the $T_r$ transmit antennas of the relay device 120.

In at least one embodiment as described hereafter, the relay device 120 determines the pre-coding matrix P that corresponds to an extreme of a function depending on an interference between signals received by the destination devices 111, 112, 113, 114, said function being subject to a constraint corresponding to the transmission power constraint. As a first example, said function represents the remaining level of interference plus noise after MMSE filtering by at least one destination device 111, 112, 113, 114. The pre-coding matrix P then corresponds to a minima of this function. As a second example, said function represents the channel capacity between at least one source device 101, 102, 103, 104 and the associated at least one destination device 111, 112, 113, 114. The pre-coding matrix P then corresponds to a maxima of this function.

Using an MMSE filtering module at the destination device identified by the index j, the remaining level of interference plus noise $\epsilon_j(P)$, after filtering by the MMSE filtering module, is expressed as follows:

$$\epsilon_j(P) = \text{Trace}(D_j - W_j(P)(H_j + F_j P \Delta_r)D_j)$$

In a first embodiment for determining the pre-coding matrix P, the relay device 120 determines the pre-coding matrix P so that it reduces the total remaining level of interference plus noise $\epsilon_{tot}(P)$, taking into account the transmission power constraint h(P). The total remaining level of interference plus noise $\epsilon_{tot}(P)$ is understood as the sum of remaining level of interference plus noise at all the destination devices 111, 112, 113, 114 for which at least one received flow of complex modulation symbols belongs to the selection obtained in step S301. The total remaining level of interference plus noise $\epsilon_{tot}(P)$ is expressed as follows:

$$\varepsilon_{tot}(P) = \sum_j \varepsilon_j(P)$$

In one embodiment, the relay device 120 determines the pre-coding matrix P corresponding to, in a Lagrange multipliers method, an extreme of a function depending on an interference between signals received by the destination devices, 111, 112, 113, 114 for which at least one received flow of complex modulation symbols belongs to the selection obtained in step S301, said function being subject to a constraint corresponding to the transmission power constraint.

The Lagrange multipliers method applied to the aforementioned expressions of $\epsilon_{tot}(P)$ and $h(P)$ is as follows:

$$\begin{cases} f(P,\lambda) = \sum_j \varepsilon_j(P) - \lambda h(P) \\ \dfrac{\partial f(P,\lambda)}{\partial P} = \sum_j \dfrac{\partial \varepsilon_j(P)}{\partial P} - \lambda \dfrac{\partial h(P)}{\partial P} = 0 \\ \dfrac{\partial f(P,\lambda)}{\partial \lambda} = h(P) = 0 \end{cases}$$

The relay device 120 therefore determines the pre-coding matrix P that solves this system of equations, wherein $\lambda$ represents the Lagrange multiplier.

As a remark, if $h(P) = \text{Trace}(\Delta_r^\dagger P^\dagger P \Delta_r) - T_r$, then:

$$\frac{\partial h(P)}{\partial P} = P\Delta_r$$

In another embodiment, the relay device 120 determines the pre-coding matrix P by using an iterative optimization algorithm, such as for instance a gradient descent. The gradient descent method is used to iteratively determine the pre-coding matrix P that corresponds to an extreme of a function depending on interference between signals received by the destination devices 111, 112, 113, 114 for which at least one received flow of complex modulation symbols belongs to the selection obtained in step S301, said function being subject to a constraint corresponding to the transmission power constraint. The gradient descent method applied to the aforementioned expressions of $\epsilon_{tot}(P)$ and $h(P)$ is as follows:

$$\hat{P}_{k+1} = P_k - \mu \sum_j \frac{\partial \varepsilon_j(P_k)}{\partial P_k^*}$$

wherein $P_k^*$ is the complex conjugate of $P_k$ and $\mu$ is a predefined convergence parameter and k represents the index of iteration.

The convergence parameter u may be set to a value obtained by field tests.

The initial matrix $P_0$ may be arbitrarily defined or selected from among a predefined set of pre-coding matrices.

The relay device 120 then checks if the resulting matrix $\hat{P}_{k+1}$ meets the requirements of the transmission power constraint $h(P)$. If these requirements are met, the relay device 120 considers that it has found a suitable pre-coding matrix P. Otherwise, another iteration is performed wherein $\hat{P}_{k+1}$ becomes $P_k$.

In other words, $\hat{P}_{k+1}$ is projected on the transmission power constraint $h(P)$ as follows, and iterations are performed until convergence of $\hat{P}_{k+1}$ and $\hat{P}_{k+1}$:

$$P_{k+1} = \hat{P}_{k+1} \cdot T_r / \text{Trace}(\Delta_r^\dagger \hat{P}_{k+1}^\dagger \hat{P}_{k+1} \Delta_r)$$

In yet another embodiment, the relay device 120 stores a plurality of pre-coding matrices. The relay device 120 determines what pre-coding matrix from among the plurality corresponds to an extreme of a function depending on an interference between signals received by at least one destination device 111, 112, 113, 114 for which at least one received flow of complex modulation symbols belongs to the selection obtained in step S301, said function being subject to a constraint corresponding to the transmission power constraint. In other words, the relay device 120 determines, for each matrix of this plurality, the total remaining level of interference plus noise $\epsilon_{tot}(P)$, taking into account the transmission power constraint $h(P)$. The relay device 120 then selects, if any, the matrix that minimizes the total remaining level of interference plus noise $\epsilon_{tot}(P)$, while meeting the requirements of the transmission power constraint $h(P)$. The selected matrix then becomes the pre-coding matrix P to be applied by the relay device 120 in order to generate pre-coded complex modulation symbols.

In a second embodiment for determining the pre-coding matrix P, the relay device 120 determines the pre-coding matrix P so that it reduces the maximum remaining level of interference plus noise $\epsilon_{max}(P)$ among the destination devices 111, 112, 113, 114 for which at least one received flow of complex modulation symbols belongs to the selection obtained in step S301, taking into account the transmission power constraint $h(P)$. The maximum remaining level of interference plus noise $\epsilon_{max}(P)$ is expressed as follows:

$$\epsilon_{max}(P) = \max(\epsilon_j(P))$$

As already mentioned, in one embodiment, the relay device 120 determines the pre-coding matrix P corresponding to, in a Lagrange multipliers method, an extreme of a function depending on an interference between signals received by the destination devices 111, 112, 113, 114 for which at least one received flow of complex modulation symbols belongs to the selection obtained in step S301, said function being subject to a constraint corresponding to the transmission power constraint. The Lagrange multipliers method applied to the aforementioned expressions of $\epsilon_{max}(P)$ and $h(P)$ is as follows:

$$\begin{cases} f(P,\lambda) = \max(\varepsilon_j(P)) - \lambda h(P) \\ \dfrac{\partial f(P,\lambda)}{\partial P} = \dfrac{\partial \max(\varepsilon_j(P))}{\partial P} - \lambda \dfrac{\partial h(P)}{\partial P} = 0 \\ \dfrac{\partial f(P,\lambda)}{\partial \lambda} = h(P) = 0 \end{cases}$$

The relay device 120 therefore determines the pre-coding matrix P that solves this system of equations.

As already mentioned, in another embodiment, the relay device 120 determines the pre-coding matrix P by using an iterative optimization algorithm, such as for instance a gradient descent. The gradient descent method is used to iteratively determine the pre-coding matrix P that corresponds to an extreme of a function depending on interference between signals received by the destination devices 111, 112, 113, 114 for which at least one received flow of complex modulation symbols belongs to the selection obtained in step S301, said function being subject to a constraint corresponding to the transmission power constraint. The gradient descent method applied to the aforementioned expressions of $\epsilon_{max}(P)$ and $h(P)$ is as follows:

$$\hat{P}_{k+1} = P_k - \mu \frac{\partial \varepsilon_m(P_k)}{\partial P_k^*}$$

wherein:

$$m = \text{argmax}(\varepsilon_j(P))$$

The initial matrix $P_0$ may be arbitrarily defined or selected from among a predefined set of pre-coding matrices.

The relay device 120 then checks if the resulting matrix $\hat{P}_{k+1}$ meets the requirements of the transmission power constraint $h(P)$. If these requirements are met, the relay device 120 considers that it has found a suitable pre-coding matrix P. Otherwise, another iteration is performed wherein $\hat{P}_{k+1}$ becomes $P_k$.

In other words, $\hat{P}_{k+1}$ is projected on the transmission power constraint h(P) as follows, and iterations are performed until convergence of $\hat{P}_{k+1}$ and $P_{k+1}$:

$$P_{k+1} = \hat{P}_{k+1} \cdot T_r / \text{Trace}(\Delta_r^\dagger \hat{P}_{k+1}^\dagger \hat{P}_{k+1} \Delta_r)$$

As already mentioned, in yet another embodiment, the relay device 120 stores a plurality of pre-coding matrices. The relay device 120 determines what pre-coding matrix from among the plurality corresponds to an extreme of a function depending on an interference between signals received by at least one destination device 111, 112, 113, 114 for which at least one received flow of complex modulation symbols belongs to the selection obtained in step S301, said function being subject to a constraint corresponding to the transmission power constraint. In other words, the relay device 120 determines, for each matrix of this plurality, the maximum remaining level of interference plus noise $\epsilon_{max}(P)$, taking into account the transmission power constraint h(P). The relay device 120 then selects, if any, the matrix that minimizes the maximum remaining level of interference plus noise $\epsilon_{max}(P)$ while meeting the requirements of the transmission power constraint h(P). The selected matrix then becomes the pre-coding matrix P to be applied by the relay device 120 in order to generate pre-coded complex modulation symbols.

In a variant of the second embodiment for determining the pre-coding matrix P, in which a gradient method is applied, a linearization of the maximum remaining level of interference plus noise may be applied. The gradient descent may then be expressed as follows:

$$\hat{P}_{k+1} = P_k - \mu \sum_j \left( q(\epsilon_j(P_k)) \frac{\partial \epsilon_j(P_k)}{\partial P_k^*} \right) \Big/ \sum_j q(\epsilon_j(P_k))$$

wherein q is a linearization function, which may be such that q(x)=x or such that q(x)=exp(x).

Similarly as for the aforementioned gradient descent methods, the relay device 120 then checks if the resulting matrix $\hat{P}_{k+1}$ meets the requirements of the transmission power constraint h(P). If these requirements are met, the relay device 120 considers that it has found a suitable pre-coding matrix P. Otherwise, another iteration is performed wherein $\hat{P}_{k+1}$ becomes $P_k$.

In other words, $\hat{P}_{k+1}$ is projected on the transmission power constraint h(P) as follows, and iterations are performed until convergence of $\hat{P}_{k+1}$ and $P_{k+1}$:

$$P_{k+1} = \hat{P}_{k+1} \cdot T_r / \text{Trace}(\Delta_r^\dagger \hat{P}_{k+1}^\dagger \hat{P}_{k+1} \Delta_r)$$

In a third embodiment for determining the pre-coding matrix P, the relay device 120 determines the pre-coding matrix P so that it reduces the generalized mean with exponent ν of the remaining level of interference $\epsilon_{gm}(P)$ among the destination devices 111, 112, 113, 114 for which at least one received flow of complex modulation symbols belongs to the selection obtained in step S301, taking into account the transmission power constraint h(P). The generalized mean with exponent ν of the remaining level of interference $\epsilon_{gm}(P)$ is expressed as follows:

$$\epsilon_{gm}(P) = \left( \frac{1}{N} \sum_{j=1}^{N} \epsilon_j(P)^\nu \right)^{1/\nu}$$

If the exponent ν is chosen equal to 1, the sum of the remaining levels of interference plus noise observed at all the destination devices 111, 112, 113, 114 is maximized. If the exponent ν is chosen as a high positive value, the largest remaining level of interference plus noise will be minimized in priority.

As already mentioned, in one embodiment, the relay device 120 determines the pre-coding matrix P corresponding to, in a Lagrange multipliers method, an extreme of a function depending on an interference between signals received by the destination devices 111, 112, 113, 114 for which at least one received flow of complex modulation symbols belongs to the selection obtained in step S301, said function being subject to a constraint corresponding to the transmission power constraint. The Lagrange multipliers method applied to the aforementioned expressions of $\epsilon_{gm}(P)$ and h(P) is as follows:

$$\begin{cases} f(P, \lambda) = \left( \frac{1}{N} \sum_{j=1}^{N} \epsilon_j(P)^\nu \right)^{1/\nu} - \lambda h(P) \\ \frac{\partial f(P, \lambda)}{\partial P} = \left( \frac{1}{N} \sum_{j=1}^{N} \epsilon_j(P)^\nu \right)^{\frac{1}{\nu}-1} \frac{1}{N} \sum_{j=1}^{N} \epsilon_j(P)^{\nu-1} \frac{\partial (\epsilon_j(P))}{\partial P} - \lambda \frac{\partial h(P)}{\partial P} = 0 \\ \frac{\partial f(P, \lambda)}{\partial \lambda} = h(P) = 0 \end{cases}$$

The relay device 120 therefore determines the pre-coding matrix P that solves this system of equations.

As already mentioned, in another embodiment, the relay device 120 determines the pre-coding matrix P by using an iterative optimization algorithm, such as for instance a gradient descent. The gradient descent method is used to iteratively determine the pre-coding matrix P that corresponds to an extreme of a function depending on interference between signals received by the destination devices 111, 112, 113, 114 for which at least one received flow of complex modulation symbols belongs to the selection obtained in step S301, said function being subject to a constraint corresponding to the transmission power constraint. The gradient descent method applied to the aforementioned expressions of $\epsilon_{gm}(P)$ and h(P) is as follows:

$$\hat{P}_{k+1} = P_k - \mu \left( \frac{1}{N} \sum_{j=1}^{N} \epsilon_j(P_k)^\nu \right)^{\frac{1}{\nu}-1} \frac{1}{N} \sum_{j=1}^{N} \left( \epsilon_j(P_k)^{\nu-1} \frac{\partial \epsilon_j(P_k)}{\partial P_k^*} \right)$$

The initial matrix $P_0$ may be arbitrarily defined or selected from among a predefined set of pre-coding matrices.

The relay device 120 then checks if the resulting matrix $\hat{P}_{k+1}$ meets the requirements of the transmission power constraint h(P). If these requirements are met, the relay device 120 considers that it has found a suitable pre-coding matrix P. Otherwise, another iteration is performed wherein $\hat{P}_{k+1}$ becomes $P_k$.

In other words, $\hat{P}_{k+1}$ is projected on the transmission power constraint h(P) as follows, and iterations are performed until convergence of $\hat{P}_{k+1}$ and $P_{k+1}$:

$$P_{k+1} = \hat{P}_{k+1} \cdot T_r / \text{Trace}\left(\Delta_r^\dagger \hat{P}_{k+1}^\dagger \hat{P}_{k+1} \Delta_r\right)$$

As already mentioned, in yet another embodiment, the relay device 120 stores a plurality of pre-coding matrices. The relay device 120 determines what pre-coding matrix from among the plurality corresponds to an extreme of a function depending on an interference between signals received by at least one destination device 111, 112, 113, 114 for which at least one received flow of complex modulation symbols belongs to the selection obtained in step S301, said function being subject to a constraint corresponding to the transmission power constraint. In other words, the relay device 120 determines, for each matrix of this plurality, the maximum remaining level of interference $\epsilon_{gm}(P)$ taking into account the transmission power constraint h(P). The relay device 120 then selects, if any, the matrix that minimizes the maximum remaining level of interference $\epsilon_{gm}(P)$, while meeting the requirements of the transmission power constraint h(P). The selected matrix then becomes the pre-coding matrix P to be applied by the relay device 120 in order to generate pre-coded complex modulation symbols.

The gradient descent methods described above in the context of the first and second embodiments for determining the pre-coding matrix P, imply determining the expression $\partial \epsilon_j(p)/\partial P^*$ for a given index j.

This expression can be differently considered in case of partial CSI knowledge and in case of full CSI knowledge.

As already mentioned, in case of partial CSI knowledge, the covariance matrix $\Sigma_j(P)$ is expressed as follows:

$$\Sigma_j(P) = (H_j + F_j P \Delta_r) \overline{D}_j (H_j + F_j P \Delta_r)^\dagger + 2\sigma_j^2 I_{R_j}$$

Then, in this case:

$$W_j(P) = D_j((H_j + F_j P \Delta_r)^\dagger (H_j + F_j P \Delta_r) + 2\sigma_j^2 I_N)^{-1}(H_j + F_j P \Delta_r)^\dagger$$

and $$\epsilon_j(P) = \text{Trace}\left(2N_0 D_j ((H_j + F_j P \Delta_r)^\dagger (H_j + F_j P \Delta_r) + 2\sigma_j^2 I_N)^{-1} D_j\right)$$

Then:

$$\frac{\partial \epsilon_j(P)}{\partial P^*} = F_j^\dagger W_j(P)^\dagger (W_j(P)(H_j + F_j P \Delta_r) - D_j)\Delta_r^\dagger$$

As already mentioned, in case of partial CSI knowledge, the covariance matrix $\Sigma \epsilon_j(P)$ is expressed as follows:

$$\Sigma_j(P) = E[(H_j + F_j P \Delta_r) \overline{D}_j (H_j + F_j P \Delta_r)^\dagger] + 2\sigma_j^2 I_{R_j}$$

Then, in this case:

$$W_j(P) = D_j(H_j + F_j P \Delta_r)^\dagger ((A_1 + F_j P \Delta_r)(A_j + F_j P \Delta_r)^\dagger + B_j)^{-1}$$

wherein:

$$A_j = E[H_j] \overline{D}_j + H_j D_j$$

and $$B_j = E[H_j \overline{D}_j H_j^\dagger] - E[H_j] \overline{D} E[H_j^\dagger] + 2\sigma_j^2 I_{R_j}$$

The matrix $A_j$ represents an estimation of the useful channel for processing a joint decoding of the complex modulation symbols by the destination device identified by the index j, and the matrix $B_j$ represents interference statistics observed at the destination device identified by the index j. The destination device identified by the index j then provides the matrices $A_j$ and $B_j$ to the relay device 120.

Then:

$$\epsilon_j(P) = \text{Trace}(D_j - D_j(H_j + F_j P \Delta_r)^\dagger ((A_j + F_j P \Delta_r)(A_j + F_j P \Delta_r)^\dagger + B_j)^{-1}(H_j + F_j P \Delta_r)D_j)$$

And, then:

$$\frac{\partial \epsilon_j(P)}{\partial P^*} = F_j^\dagger W_j(P)^\dagger (W_j(P)(A_j + F_j P \Delta_r) - D_j)\Delta_r^\dagger$$

As it can be noticed, when $A_j = H_j$ and $B_j = 2\sigma_j^2 I_{R_j}$, the same expressions are obtained as for the case where full CSI knowledge is assumed.

In may further be noted that the pre-coding matrix P can be used in order to increase the quality of the signals received by at least one destination device 111, 112, 113, 114 upstream from the MMSE filtering module or even when the destination devices 111, 112, 113, 114 don't include an MMSE filtering module.

In a fourth embodiment for determining the pre-coding matrix P, as aforementioned, the relay device 120 may determine the pre-coding matrix P that corresponds to an extreme of a function representing the capacity of the transmission channels between the source devices 101, 102, 103, 104, and their associated destination devices 111, 112, 113, 114, for which at least one transmitted flow of complex modulation symbols belongs to the selection obtained in step S301. The pre-coding matrix P corresponds in this case to a maxima of such function, or equivalently to a minima of the additive inverse function.

The capacity $C_j(P)$ of the transmission channel from one source device identified by the index j to its associated destination device may be expressed as follows:

$$C_j(P) = \log_2(\det((H_j + F_j P \Delta_r)(H_j + F_j P \Delta_r)^\dagger + 2_j^2 I_N)) - \log_2(\det((H_j + F_j P \Delta_r) \overline{D}_j (H_j + F_j P \Delta_r)^\dagger + 2_j^2 I_N))$$

The relay device 120 may determine the pre-coding matrix P that maximizes, taking into account the transmission power constraint h(P), the generalized mean with exponent v of the channel capacity of the wireless telecommunications network 100, referring to the transmission channels from the source devices 101, 102, 103, 104 to their respective associated destination devices 111, 112, 113, 114, and for which at least one transmitted flow of complex modulation symbols belongs to the selection obtained in step S301. In that case, the relay device 120 targets determining the pre-coding matrix P that corresponds, taking into account the transmission power constraint h(P), to an extreme of the generalized mean of the transmission channel capacities from the source devices 101, 102, 103, 104 to their respective associated destination devices 111, 112, 113, 114, and for which at least one transmitted flow of complex modulation symbols belongs to the selection obtained in step S301. The transmission channel capacity C(P) to be maximized is then expressed as follows:

$$C(P) = \left(\frac{1}{N} \sum_{j=1}^{N} C_j(P)^v\right)^{1/v}$$

As already mentioned, in one embodiment, the relay device 120 determines the pre-coding matrix P corresponding to, in a Lagrange multipliers method, an extreme of a function depending on an interference between signals received by the destination devices 111, 112, 113, 114 for which at least one received flow of complex modulation symbols belongs to the selection obtained in step S301, said function being subject to a constraint corresponding to the transmission power constraint. The Lagrange multipliers method applied to the aforementioned expressions of C(P) and h(P) is as follows:

$$\begin{cases} f(P, \lambda) = \left(\frac{1}{N}\sum_{j=1}^{N} C_j(P)^v\right)^{1/v} - \lambda h(P) \\ \frac{\partial f(P, \lambda)}{\partial P} = \left(\frac{1}{N}\sum_{j=1}^{N} C_j(P)^v\right)^{\frac{1}{v}-1} \frac{1}{N}\sum_{j=1}^{N} C_j(P)^{v-1}\frac{\partial(C_j(P))}{\partial P} - \lambda\frac{\partial h(P)}{\partial P} = 0 \\ \frac{\partial f(P, \lambda)}{\partial \lambda} = h(P) = 0 \end{cases}$$

If exponent v is chosen equal to 1, the sum of all capacities is maximized. If exponent v is chosen as a negative value, the lowest capacities of the transmission channels from the source devices 101, 102, 103, 104 to their respective associated destination devices 111, 112, 113, 114, and for which at least one received flow of complex modulation symbols belongs to the selection obtained in step S301, will be maximized in priority.

As already mentioned, in one embodiment, the relay device 120 may determine the pre-coding matrix P by using an iterative optimization algorithm, such as for instance a gradient descent. The gradient descent method is used to iteratively determine the pre-coding matrix P that corresponds to an extreme of a function depending on the capacity of the transmission channels from the source devices 101, 102, 103, 104 and their respective associated destination devices 111, 112, 113, 114, said function being subject to a constraint corresponding to the transmission power constraint. The gradient descent method applied to the aforementioned expressions of $C_j(P)$ and h(P), when maximizing the generalized mean of the capacities of the transmission channels, may be expressed as follows:

$$\hat{P}_{k+1} = P_k + \mu\left(\frac{1}{N}\sum_{j=1}^{N} C_j(P)^v\right)^{\frac{1}{v}-1} \frac{1}{N}\sum_{j=1}^{N} C_j(P)^{v-1}\frac{\partial(C_j(P_k))}{\partial P_k^*}$$

The relay device 120 then checks if the resulting matrix $\hat{P}_{k+1}$ meets the requirements of the transmission power constraint h(P). If these requirements are met, the relay device 120 considers that it has found a suitable pre-coding matrix P. Otherwise, another iteration is performed wherein $\hat{P}_{k+1}$ becomes $P_k$.

In other words, $\hat{P}_{k+1}$ is projected on the transmission power constraint h(P) as follows, and iterations are performed until convergence of $\hat{P}_{k+1}$ and $P_{k+1}$:

$$P_{k+1} = \hat{P}_{k+1} \cdot T_r / \text{Trace}(\Delta_r^\dagger \hat{P}_{k+1}^\dagger \hat{P}_{k+1} \Delta_r)$$

The gradient descent methods described above in the context of the third embodiment for determining the pre-coding matrix P, implies determining the expression $\partial C_j(P)/\partial P^*$ for a given index j.

This expression can be differently considered in case of partial CSI knowledge and in case of full CSI knowledge. Hereafter is presented the expression of $\partial C_j(P)/\partial P^*$ in case of full CSI knowledge:

$$\frac{\partial C_j(P)}{\partial P^*} =$$

$$\frac{1}{\ln(2)}\left[F_j^\dagger\left((H_j + F_jP\Delta_r)(H_j + F_jP\Delta_r)^\dagger + 2\sigma_j^2 I_{R_j}\right)^{-1}(H_j + F_jP\Delta_r)\Delta_r^\dagger\right] -$$

$$\frac{1}{\ln(2)}\left[F_j^\dagger\left((H_j + F_jP\Delta_r)\overline{D_j}(H_j + F_jP\Delta_r)^\dagger + 2\sigma_j^2 I_{R_j}\right)^{-1}(H_j + F_jP\Delta_r)\overline{D_j}\Delta_r^\dagger\right]$$

The one with ordinary skills in the art would be able to derive from the teachings herein a suitable expression of $\partial C_j(P)/\partial P^*$ in case of partial CSI knowledge.

It can be noted that the methods for determining the pre-coding matrix P by using a selection among a plurality of predetermined pre-coding matrices may also be similarly applied in the context of the function representing the capacity of the transmission channel from the source devices 101, 102, 103, 104 and their respective associated destination devices 111, 112, 113, 114.

It can be noticed that the overall performance of the wireless telecommunications network 100 is increased if at least one of the transmission channel capacities $C_j(P)$ in the wireless telecommunications network 100 is improved. Therefore, the relay device 120 may apply other optimization rules of the transmission channel capacity in order to determine the pre-coding matrix P. For instance, the relay device 120 targets determining the pre-coding matrix P that corresponds, taking into account the transmission power constraint h(P), to a maximum mean value of the transmission channel capacities in the wireless telecommunications network 100, referring to the transmission channels from the source devices 101, 102, 103, 104 to their respective associated destination devices 111, 112, 113, 114, and for which at least one received flow of complex modulation symbols belongs to the selection obtained in step S301.

In a following step S303, the relay device 120 transmits the determined pre-coding matrix P to the destination devices 111, 112, 113, 114. Then, the step S301 may be repeated to take into account any change of the selection of flows of complex modulation symbols for which the pre-coding has to be applied, and the relay device 120 updates the pre-coding matrix P accordingly. Such a change of the selection of flows of complex modulation symbols for which the pre-coding has to be applied is detailed hereafter with regard to steps S403 and S502 of FIGS. 4 and 5 respectively.

In another embodiment, pre-coded pilots are used in the wireless transmission from the relay device 120 to the destination devices 111, 112, 113, 114. It is therefore not necessary that the relay device 120 transmit the determined pre-coding matrix P to the destination devices 111, 112, 113, 114. In this case, the destination devices 111, 112, 113, 114 are able to obtain an estimation of the product $F_jP$.

The algorithm of FIG. 3 may be periodically executed or be executed when transmission channel conditions change between any source device 101, 102, 103, 104 and the destination devices 111, 112, 113, 114 and/or between the relay device 120 and the destination devices 111, 112, 113, 114.

It may further be noted that, if no pre-coding matrix meeting the requirements of the transmission power constraint is found, the relay device 120 doesn't transmit complex modulation symbols to the destination devices 111, 112, 113, 114.

FIG. 4 schematically represents an algorithm performed by the relay device 120, according to a first embodiment for transmitting pre-coded complex modulation symbols to at least one destination device 111, 112, 113, 114.

In a step S401, the relay device 120 determines information words to be transmitted by at least one source device 101, 102, 103, 104.

In one embodiment, the relay device 120 receives beforehand these information words from the concerned source device(s) 101, 102, 103, 104.

In another embodiment, the relay device 120 is further adapted to receive the flows of complex modulation symbols transmitted by the source devices 101, 102, 103, 104, and makes attempts to retrieve the information words from which the received complex modulation symbols are derived by applying a decoding to the received complex modulation symbols. The relay device 120 is therefore able to use the retrieved information words when the concerned source device 101, 102, 103 or 104 performs a retransmission of these information words. An occurrence of such a retransmission may be determined by capturing and analysing the feedback provided by the destination device 110 when an HARQ mechanism is used between the source devices 101, 102, 103, 104 and the destination device 110.

In a following step S402, the relay device 120 determines complex modulation symbols corresponding to, or derived from, the determined information words.

In the following step S403, the relay device 120 selects at least one flow of complex modulation symbols for which a pre-coding has to be applied. In the context of this first embodiment for transmitting pre-coded complex modulation symbols, the relay device 120 selects the flow, or flows, of complex modulation symbols for which the relay device 120 succeeded in retrieving, or obtaining, the information word(s) in the step S401.

In a variant, the relay device 120 may in addition take into account information provided by the destination devices 111, 112, 113, 114. The destination devices 111, 112, 113, 114 may provide to the relay device 120 information indicating the flow, or flows, of complex modulation symbols for which the concerned destination device succeeded in retrieving the information word(s). As an alternative, this information may indicate the flow, or flows, of complex modulation symbols for which the concerned destination device didn't succeed in retrieving the information word(s).

The relay device 120 then uses, in addition to the information indicating the flows of complex modulation symbols for which the relay device 120 succeeded in obtaining the information words in the step S401, the information provided by the destination devices 111, 112, 113, 114, in order to select the flows of complex modulation symbols for which an increasing of the quality is targeted. This allows the relay device 120 to obtain a pre-coding matrix P that focuses the distribution of its transmission power on the signals that are not yet decoded by the destination devices 111, 112, 113, 114.

In a following step S404, the relay device 120 applies a pre-coding to the complex modulation symbols determined in the step S402, on the basis of the pre-coding matrix P determined at the step S302. This step enables the relay device 120 to generate pre-coded complex modulation symbols.

The steps S403 and S404 may be repeated when a change of the selection of flows of complex modulation symbols for which the pre-coding has to be applied occurs.

Such a change may occur during the transmission of complex modulation symbols. Indeed, when two flows of complex modulation symbols are transmitted on the same resource, the transmission of one of these flows may end before the transmission of the other flow. Therefore, a switch from one pre-coding matrix to another may be performed during the transmission of said other flow. This allows optimizing the distribution of the transmission power at the relay device 120 for increasing the quality of signals still under transmission.

In a following step S404, the relay device 120 transmits to the destination devices 111, 112, 113, 114, for which the flows of complex modulation symbols selected in the step S403 are intended, the pre-coded complex modulation symbols obtained during the step S403.

Therefore, by using the pre-coding matrix P, the relay device 120 transmits to at least one destination device 111, 112, 113, 114 pre-coded complex modulation symbols that allow the increasing of the quality of the signals received by the concerned destination device(s), and in particular, the increasing of the SINR of these signals.

FIG. 5 schematically represents an algorithm performed by the relay device 120, according to a second embodiment for transmitting pre-coded complex modulation symbols to at least one destination device 111, 112, 113, 114.

In a step S501, the relay device 120 takes into account information provided by the destination devices 111, 112, 113, 114, and which indicates the flow, or flows, of complex modulation symbols for which the concerned destination device succeeded in retrieving the information word(s).

As an alternative, this information may indicate the flow, or flows, of complex modulation symbols for which the concerned destination device didn't succeed in retrieving the information word(s).

The relay device 120 then uses the information provided by the destination devices 111, 112, 113, 114, for determining the flow of complex modulation symbols for which an increasing of the quality of signals, as received by the concerned destination device, is targeted. This allows the relay device 120 to obtain a pre-coding matrix P that focuses the distribution of its transmission power on the signals that are not yet decoded by the destination devices 111, 112, 113, 114.

In a following step S502, the relay device 120 selects accordingly the flows of complex modulation symbols for which the pre-coding has to be applied. For example, on the basis of an information received from the destination devices 111, 112, 113, 114, the relay device 120 selects a given number of flow of complex modulation symbols for which the signals, as received by the concerned destination devices 111, 112, 113, 114, exhibit the lowest performance.

In a following step S502, the relay device 120 obtains estimates of complex modulation symbols to be transmitted in the flow, or flows, selected in the step S502. These estimates may correspond to complex modulation symbols as received by the relay device 120 from source devices, potentially amplified. The relay device 120 then uses these estimates as input to the pre-coding matrix P in order to generate pre-coded complex modulation symbols.

In a following step S503, the relay device 120 obtains the pre-coding matrix P as described with regard to FIG. 3 and applies the pre-coding to the estimates of complex modulation symbols, on the basis of the obtained pre-coding matrix P. This step enables the relay device 120 to generate the pre-coded complex modulation symbols.

Similarly as for the steps S403 and S404 of FIG. 4, the steps S502 and S503 may be repeated when a change of the selection of flows of complex modulation symbols for which a pre-coding has to be applied occurs.

In a following step S504, the relay device 120 transmits the pre-coded complex modulation symbols obtained during the step S503 to at least one destination device 111, 112, 113, 114, to which the selected flows of complex modulation symbols are intended.

Therefore, by using the pre-coding matrix P, the relay device 120 transmits to at least one destination device 111, 112, 113, 114 pre-coded complex modulation symbols that allow the increasing of the quality of the signals received by the concerned destination device(s), and in particular, the increasing of the SINR of these signals.

It may be noted that any information provided by the destination devices 111, 112, 113, 114 to the relay device 120 may be either directly or indirectly transferred. For instance, such information may be transferred from the destination devices 111, 112, 113, 114 to the relay device 120 via their respective source devices 101, 102, 103, 104.

The invention claimed is:

1. A method for determining a configuration of a wireless telecommunications network, the configuration aiming at increasing a quality of signals received by at least one destination device among plural destination devices of the wireless telecommunications network, plural flows of complex modulation symbols being transmitted on a same resource by respective source devices of the wireless telecommunications network, the source devices being associated with respective destination devices, each source device transmitting at least one flow of complex modulation symbols on the same resource to its associated destination device, the method comprising:
  obtaining a first set of channel matrices representing transmission channels between the source devices and each destination device and a second set of channel matrices representing transmission channels between a relay device of the wireless telecommunications network and each destination device;
  selecting at least one flow of complex modulation symbols for which the relay device has to apply a pre-coding; and
  determining a pre-coding matrix aiming at being used by the relay device for applying the pre-coding to be able to transmit pre-coded complex modulation symbols, on the same resource as the complex modulation symbols transmitted by the source devices, to increase the quality of signals received by at least one destination device,
  the pre-coding matrix being determined on the basis of the first and second sets of channel matrices, of the selected at least one flow of complex modulation symbols, and of a transmission power constraint applicable to the relay device.

2. The method according to claim 1, wherein the selecting comprises obtaining, from each destination device, an information indicating at least one flow of complex modulation symbols aimed at being received by the destination device and for which the destination device is able, or not, to successfully decode complex modulation symbols.

3. The method according to claim 1, wherein the selecting comprises identifying at least one flow of complex modulation symbols for which the relay device is able to decode complex modulation symbols.

4. The method according to claim 1, wherein the transmission power constraint is related to a global transmission power budget for a whole set of transmit antennas of the relay device or to individual transmission power budget for each transmit antenna of the relay device.

5. The method according to claim 1, wherein the determining determines the pre-coding matrix corresponding to an extreme of a function depending on interference observed on at least one flow of complex modulation symbols selected in the selecting, the interference being observed by the destination device to which the flow of complex modulation symbols is transmitted and the function being subject to a constraint corresponding to the transmission power constraint.

6. The method according to claim 5, wherein the function represents interference between signals received by the at least one destination device, which remains after application, by the at least one destination device, of a minimum mean square error filtering and wherein the determined pre-coding matrix corresponds to a minima of the function.

7. The method according to claim 6, wherein the function represents:
  a maximum interference between signals received by any destination device to which at least one selected flow of complex modulation symbols is transmitted;
  a sum of interferences between signals received by the destination devices to which at least one selected flow of complex modulation symbols is transmitted; or
  a generalized mean of interferences between signals received by the destination devices to which at least one selected flow of complex modulation symbols is transmitted.

8. The method according to claim 5, wherein the function represents a capacity of the transmission channel between at least one source device and its respective associated destination device, and wherein the determined pre-coding matrix corresponds to a maxima of the function.

9. The method according to claim 8, wherein the function represents:
  the minimum transmission channel capacity between any source device transmitting at least one selected flow of complex modulation symbols and its associated destination device;
  a sum of transmission channel capacities between the source devices transmitting at least one selected flow of complex modulation symbols and their associated destination devices; or
  a generalized mean of transmission channel capacities between the source devices transmitting at least one selected flow of complex modulation symbols and their associated destination devices.

10. The method according to claim 5, wherein the determining:
  determines the pre-coding matrix, corresponding to the extreme of the function, using a Lagrange multipliers method; or
  uses a gradient descent method for iteratively determining the pre-coding matrix corresponding to the extreme of the function; or
  obtains a plurality of pre-coding matrices and determining what pre-coding matrix from among the plurality of pre-coding matrices corresponds to the extreme of the function.

11. A method for increasing a quality of signals received by at least one destination device among plural destination devices of a wireless telecommunications network, plural flows of complex modulation symbols being transmitted on a same resource by respective source devices of the wireless telecommunications network, the source devices being associated with respective destination devices, each source device transmitting at least one flow of complex modulation symbols on the same resource to its associated destination device, wherein a relay device of the wireless telecommunications network performs:
  obtaining a first set of channel matrices representing transmission channels between the source devices and each destination device and a second set of channel matrices representing transmission channels between the relay device and each destination device;
  selecting at least one flow of complex modulation symbols for which the relay device has to apply a pre-coding;

determining a pre-coding matrix aiming at increasing the quality of signals received by at least one destination device, the pre-coding matrix being determined on the basis of the first and second sets of channel matrices, of the selected at least one flow of complex modulation symbols, and of a transmission power constraint applicable to the relay device;

applying the pre-coding to the selected at least one flow of complex modulation symbols, by using the determined pre-coding matrix to generate pre-coded complex modulation symbols; and transmitting the pre-coded complex modulation symbols on the same resource as the complex modulation symbols transmitted by the source devices.

12. The method according to claim 11, wherein the selecting comprises obtaining, from each destination device, an information indicating at least one flow of complex modulation symbols aimed at being received by the destination device and for which the destination device is able to decode complex modulation symbols, and wherein the pre-coding applies the pre-coding to complex modulation symbols generated by the relay device following a decoding of complex modulation symbols received from at least one source device, or in applying the pre-coding to an estimate of complex modulation symbols received from at least one source device.

13. The method according to claim 11, wherein the selecting comprises identifying at least one flow of complex modulation symbols for which the relay device is able to decode complex modulation symbols, and wherein the pre-coding applies the pre-coding to the complex modulation symbols that the relay device is able to decode.

14. A device for determining a configuration of a wireless telecommunications network, the configuration aiming at increasing a quality of signals received by at least one destination device among plural destination devices of the wireless telecommunications network, plural flows of complex modulation symbols being transmitted on a same resource by respective source devices of the wireless telecommunications network, the source devices being associated with respective destination devices, each source device transmitting at least one flow of complex modulation symbols on the same resource to its associated destination device, wherein the device for determining the configuration of the wireless telecommunications network comprises:

obtaining means for obtaining a first set of channel matrices representing transmission channels between the source devices and each destination device and a second set of channel matrices representing transmission channels between a relay device of the wireless telecommunications network and each destination device;

selecting means for selecting at least one flow of complex modulation symbols for which the relay device has to apply a pre-coding; and determining means for determining a pre-coding matrix aiming at being used by the relay device for applying the pre-coding to be able to transmit pre-coded complex modulation symbols, on the same resource as the complex modulation symbols transmitted by the source devices, to increase the quality of signals received by at least one destination device, the determining means being adapted so that the pre-coding matrix is determined on the basis of the first and second sets of channel matrices, of the selected at least one flow of complex modulation symbols and of a transmission power constraint applicable to the relay device.

15. A relay device for increasing a quality of signals received by at least one destination device among plural destination devices of a wireless telecommunications network, plural flows of complex modulation symbols being transmitted on a same resource by respective source devices of the wireless telecommunications network, the source devices being associated with respective destination devices, each source device transmitting at least one flow of complex modulation symbols on the same resource to its associated destination device, wherein the relay device comprises:

obtaining means for obtaining a first set of channel matrices representing transmission channels between the source devices and each destination device and a second set of channel matrices representing transmission channels between the relay device and each destination device;

selecting means for selecting at least one flow of complex modulation symbols for which the relay device has to apply a pre-coding;

determining means for determining a pre-coding matrix aiming at increasing the quality of signals received by at least one destination device, the pre-coding matrix being determined on the basis of the first and second sets of channel matrices, of the selected at least one flow of complex modulation symbols and of a transmission power constraint applicable to the relay device;

pre-coding means for applying the pre-coding to the selected at least flow of complex modulation symbols, by using the determined pre-coding matrix to generate pre-coded complex modulation symbols; and transmitting means for transmitting the pre-coded complex modulation symbols on the same resource as the complex modulation symbols transmitted by the source devices.

* * * * *